US005478968A

United States Patent [19]

Kitagawa et al.

[11] Patent Number: 5,478,968

[45] Date of Patent: Dec. 26, 1995

[54] STEREOPHONIC SOUND GENERATION SYSTEM USING TIMING DELAY

[75] Inventors: Hiroshi Kitagawa, Iwata; Gen Izumisawa, Hamamatsu, both of Japan

[73] Assignee: Kawai Musical Inst. Mfg. Co., Ltd., Shizuoka, Japan

[21] Appl. No.: 813,933

[22] Filed: Dec. 27, 1991

[30] Foreign Application Priority Data

| | | | |
|---|---|---|---|
| Dec. 28, 1990 | [JP] | Japan | 2-408859 |
| Apr. 3, 1991 | [JP] | Japan | 3-071256 |
| Aug. 14, 1991 | [JP] | Japan | 3-204404 |

[51] Int. Cl.[6] .............................. G10H 7/00; G10H 1/02; G01P 3/00

[52] U.S. Cl. .......................... 84/626; 84/630; 84/DIG. 27

[58] Field of Search .............................. 84/626, 630, 662, 84/DIG. 1, DIG. 26, DIG. 27

[56] References Cited

U.S. PATENT DOCUMENTS

| | | | |
|---|---|---|---|
| 5,127,306 | 7/1992 | Mitsuhashi et al. | 84/665 |
| 5,144,673 | 9/1992 | Matsumoto et al. | 381/61 |
| 5,241,604 | 8/1993 | Noguchi | 381/63 |
| 5,252,774 | 10/1993 | Hasebe et al. | 84/618 |
| 5,338,892 | 8/1994 | Sekine et al. | 84/662 |

*Primary Examiner*—William M. Shoop, Jr.
*Assistant Examiner*—Jeffrey W. Donels

[57] ABSTRACT

A moment at which each of a plurality of pieces of sound data is generated in response to one sounding operation is controlled, and the plurality of pieces of sound data are output to different sounding units. Consequently, differences occur among moments at which sounds are radiated by the sounding units, resulting in an occurrence of differences among lengths of time taken by the sounds to reach the ears of a listener, whereby a stereophonic sound can be produced and the listener can localize a sound image. A stereophonic sound system provided with a sound generating unit for generating sound data, a generation control unit for controlling a generation of sound data in the sound generating unit in such a manner that a plurality of pieces of sound data are generated in parallel with one another in response to a sounding operation, a generation moment control unit for controlling a moment at which each piece of the sound data generated in parallel with one another is produced, and an output unit for outputting the plurality of pieces of sound data generated by the sound generating unit under control of the generation control unit, at moments controlled by the generation moment control unit, to different sounding units.

17 Claims, 13 Drawing Sheets

MEM.: MEMORY

CKT. : CIRCUIT

FIG. 4

ASSIGNMENT MEMORY

15

| ADDRESS | | | |
|---|---|---|---|
| 00 | ON/OFF | KEY NUMBER KN | CH0 |
| 01 | R/L | DELAY TIME DT | |
| 02 | | VELOCITY VL | |
| 03 | | TONE NUMBER TN | |
| 04 | ON/OFF | KEY NUMBER KN | CH1 |
| 05 | R/L | DELAY TIME DT | |
| 06 | | VELOCITY VL | |
| 07 | | TONE NUMBER TN | |
| 08 | ON/OFF | KEY NUMBER KN | CH2 |
| 09 | R/L | DELAY TIME DT | |
| 0A | | VELOCITY VL | |
| 0B | | TONE NUMBER TN | |
| 0C | ON/OFF | KEY NUMBER KN | CH3 |
| 0D | R/L | DELAY TIME DT | |
| 0E | | VELOCITY VL | |
| 0F | | TONE NUMBER TN | |
| | | ⋮ | |
| 7C | ON/OFF | KEY NUMBER KN | CH31 |
| 7D | R/L | DELAY TIME DT | |
| 7E | | VELOCITY VL | |
| 7F | | TONE NUMBER TN | |

FIG. 9

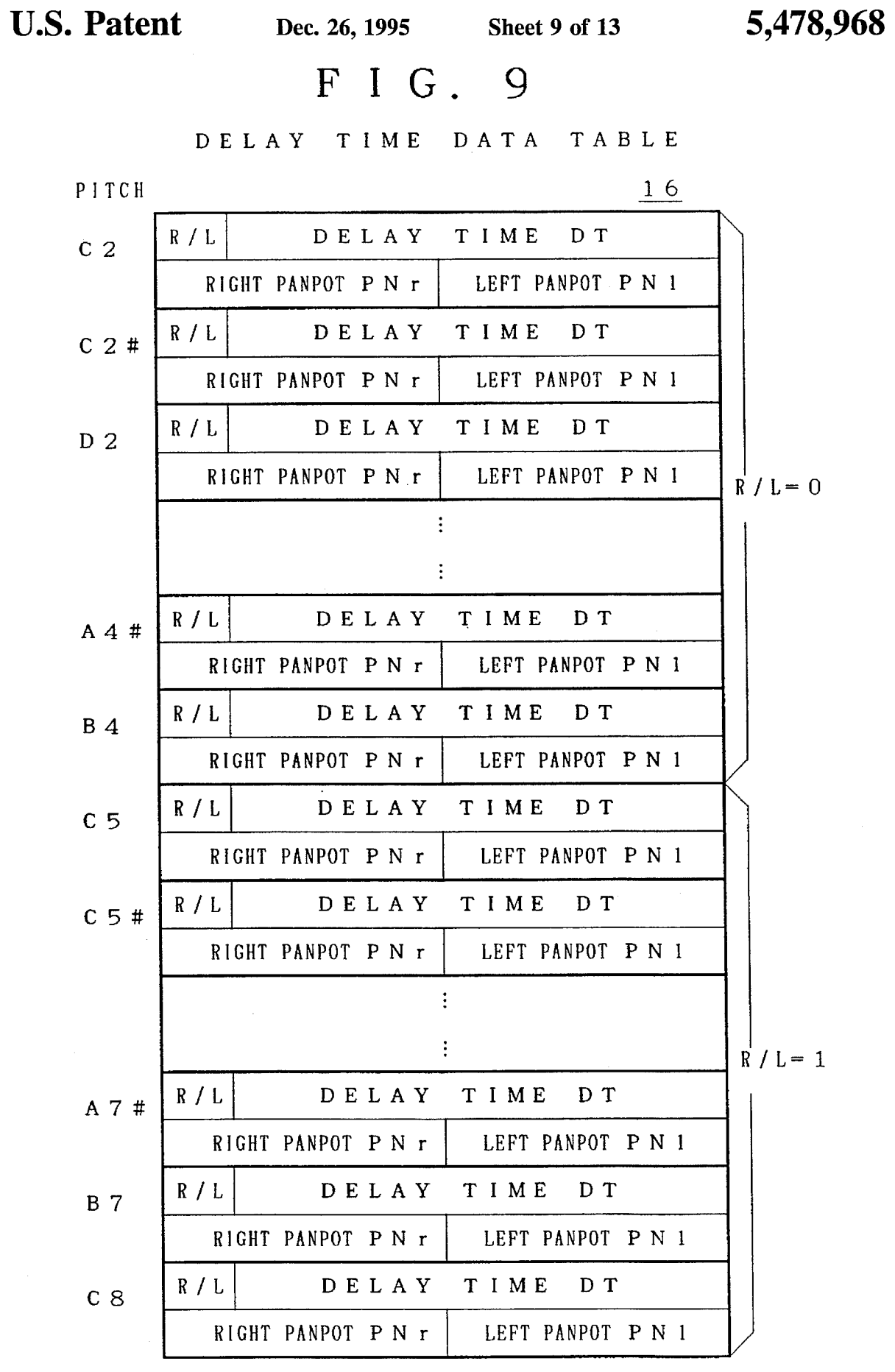

DELAY TIME DATA TABLE

| PITCH | 16 | | |
|---|---|---|---|
| C 2 | R / L | DELAY TIME DT | R / L = 0 |
| | RIGHT PANPOT P N r | LEFT PANPOT P N l | |
| C 2 # | R / L | DELAY TIME DT | |
| | RIGHT PANPOT P N r | LEFT PANPOT P N l | |
| D 2 | R / L | DELAY TIME DT | |
| | RIGHT PANPOT P N r | LEFT PANPOT P N l | |
| | ⋮ | ⋮ | |
| A 4 # | R / L | DELAY TIME DT | |
| | RIGHT PANPOT P N r | LEFT PANPOT P N l | |
| B 4 | R / L | DELAY TIME DT | |
| | RIGHT PANPOT P N r | LEFT PANPOT P N l | |
| C 5 | R / L | DELAY TIME DT | R / L = 1 |
| | RIGHT PANPOT P N r | LEFT PANPOT P N l | |
| C 5 # | R / L | DELAY TIME DT | |
| | RIGHT PANPOT P N r | LEFT PANPOT P N l | |
| | ⋮ | ⋮ | |
| A 7 # | R / L | DELAY TIME DT | |
| | RIGHT PANPOT P N r | LEFT PANPOT P N l | |
| B 7 | R / L | DELAY TIME DT | |
| | RIGHT PANPOT P N r | LEFT PANPOT P N l | |
| C 8 | R / L | DELAY TIME DT | |
| | RIGHT PANPOT P N r | LEFT PANPOT P N l | |

KEY PROCESSING (CONTINUED)

PANPOT CKT.

STEREOPHONIC SOUND GENERATION SYSTEM USING TIMING DELAY

BACKGROUND OF THE INVENTION

1. Field of the Invention

This invention generally relates to a stereophonic sound system, and more particularly, to the type of stereophonic sound system by which generation of a plurality of acoustical data is controlled by staggering moments at which the acoustical data is generated.

2. Description of the Related Art

In the field of electronic musical instruments, a panpot is known as an example of a conventional device for artificially producing a stereophonic sound from a monaural sound. The panpot is a device for moving a sound image by distributing monaural sound signals to left and right sounding systems and changing the gain thereof for each monaural sound signal (i.e., increasing the signal power of each monaural sound signal) by using attenuators.

The panpot causes a right loudspeaker to produce sounds from the monaural sound signal by using a right attenuator, and causes a left loudspeaker to produce sounds from the monaural sound signal by using a left attenuator. Further, the panpot performs a right localization-shift of a sound image by increasing the gain of the right attenuator or reducing the gain of the left attenuator. Conversely, the panpot effects a left localization-shift of a sound image by reducing the gain of the right attenuator or increasing the gain of the left attenuator.

Accordingly, a stereophonic sound can be artificially produced by a conventional stereophonic sound system employing such a panpot, by controlling the volumes of the right and left sound sources. The present invention, however, is directed to a new stereophonic sound system, entirely different from such a conventional stereophonic sound system. Namely, an object of the present invention is to provide a stereophonic sound system for producing a stereophonic sound by controlling a moment at which a sound is generated from a right sound source, and another moment at which a sound is generated from a left sound source.

SUMMARY OF THE INVENTION

To achieve the foregoing object, in accordance with an aspect of the present invention, there is provided a stereophonic sound system which comprises sound generating means for generating sound data, generation control means for controlling the generation of sound data in the sound generating means in such a manner that a plurality of pieces of sound data are generated in parallel with one another in response to a sounding operation, a generation time control means for controlling a time at which each piece of the sound data generated in parallel with one another is produced, and output means for outputting the plurality of pieces of sound data, generated by the sound generating means under the control of the generation control means, at moments controlled by the generation time control means to different sounding means.

Namely, the time at which each of a plurality of pieces of sound data is generated in response to a sounding operation is controlled, and the plurality of pieces of sound data are output to different sounding means, and therefore, differences occur among the moments at which sounds are radiated by the sounding means, and accordingly, differences occur among lengths of time taken by the sounds to reach the ears of a listener, whereby a stereophonic sound can be produced and the listener can localize a sound image.

In accordance with another aspect of the present invention, there is provided a stereophonic sound system which comprises sound generating means for generating sound data in a time-sharing manner, a generation control means for controlling a generation of sound data in the sound generating means in such a manner that a plurality of pieces of sound data are generated in parallel with one another in a time-sharing manner in response to a sounding operation, level control means for controlling a level of each piece of the sound data generated in parallel with one another in a time-sharing manner, and output means for outputting the plurality of pieces of sound data, generated by the sound generating means under the control of the generation control means, by controlling the levels thereof by the generation time control means to different sounding means.

BRIEF DESCRIPTION OF THE DRAWINGS

Other features, objects and advantages of the present invention will become apparent from the following description of preferred embodiments with reference to the drawings, in which like reference characters designate like or corresponding parts throughout several views, and in which:

FIG. 4 is a diagram illustrating the contents of an assignment memory 15 in a first embodiment;

FIG. 9 is a diagram illustrating the contents of a delay time data table 16 of the second embodiment;

DESCRIPTION OF THE PREFERRED EMBODIMENTS

Hereinafter, preferred embodiments of the present invention will be described in detail, with reference to the accompanying drawings.

1. First Embodiment

Figure 1:
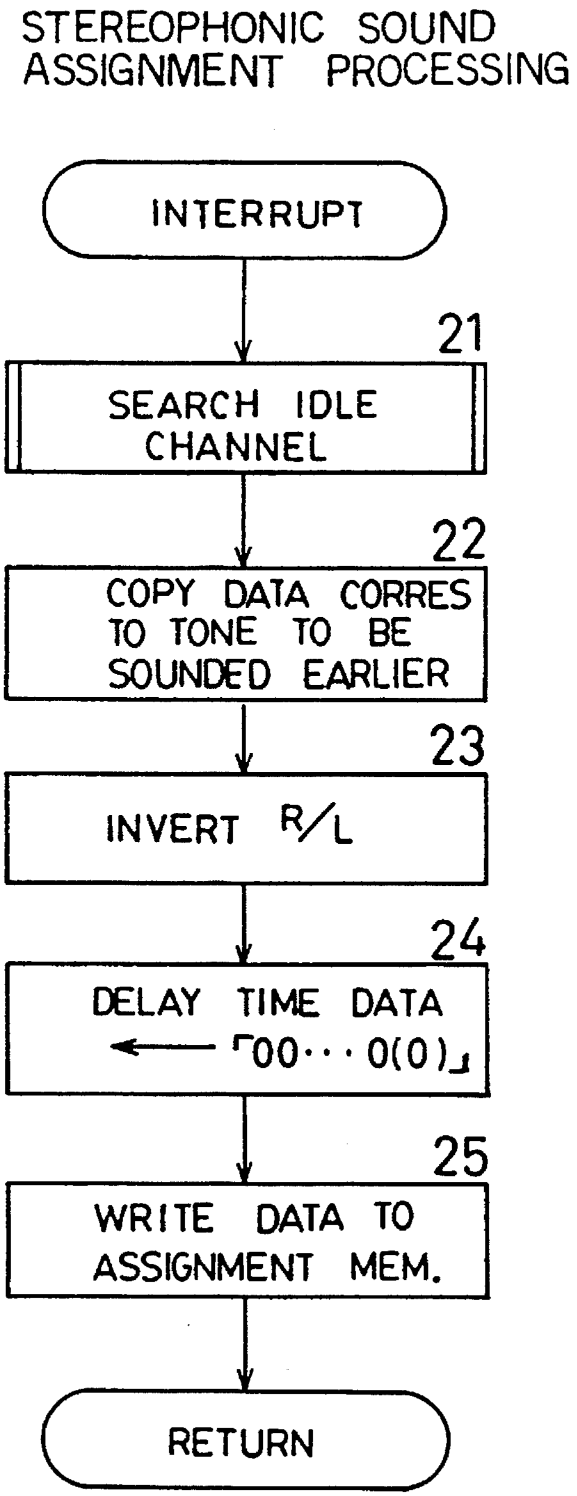
FIG. 1 is a flowchart of a program for performing an assignment processing of stereophonic sounds.
Figure 2:
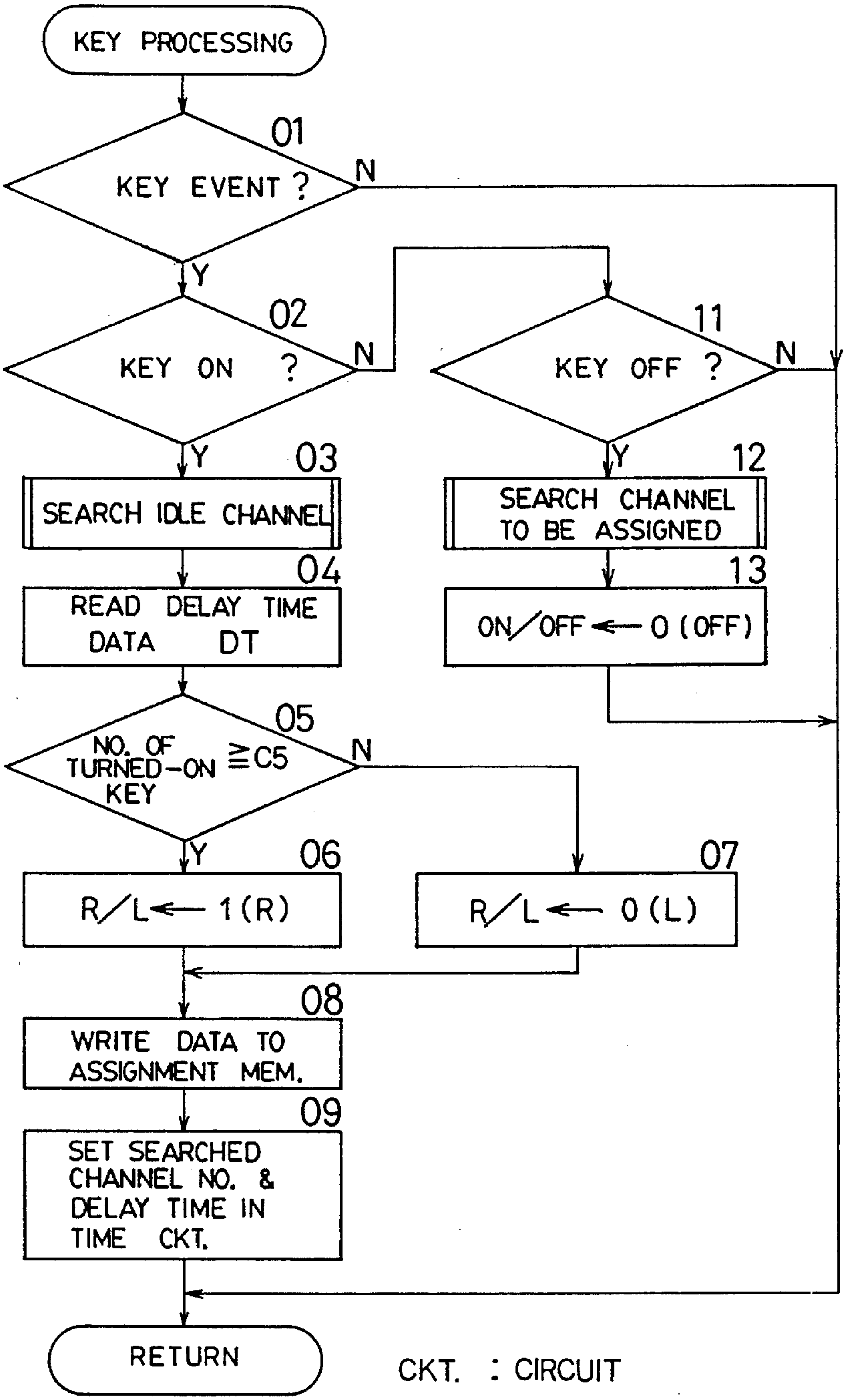
FIG. 2 is a flowchart of a program for performing a key processing.

The first embodiment of the present invention will now be described. An outline of an operation of the first embodiment is as follows. As shown in FIGS. 1 and 2, if a key on operation is performed in step 02, sound data corresponding to one of a right sound source and a left sound source is selected in steps 06 and 07, and delay time data DT is set in a timer circuit 14 in step 09. After a lapse of time indicated by the delay time data DT, the remaining sound data is selected and tones represented by the remaining sound data are sounded in steps 22 to 25. Before describing the operation of the first embodiment in detail, the construction of the first embodiment will be described hereinbelow.

1-1. Entire Circuit

Figure 3:
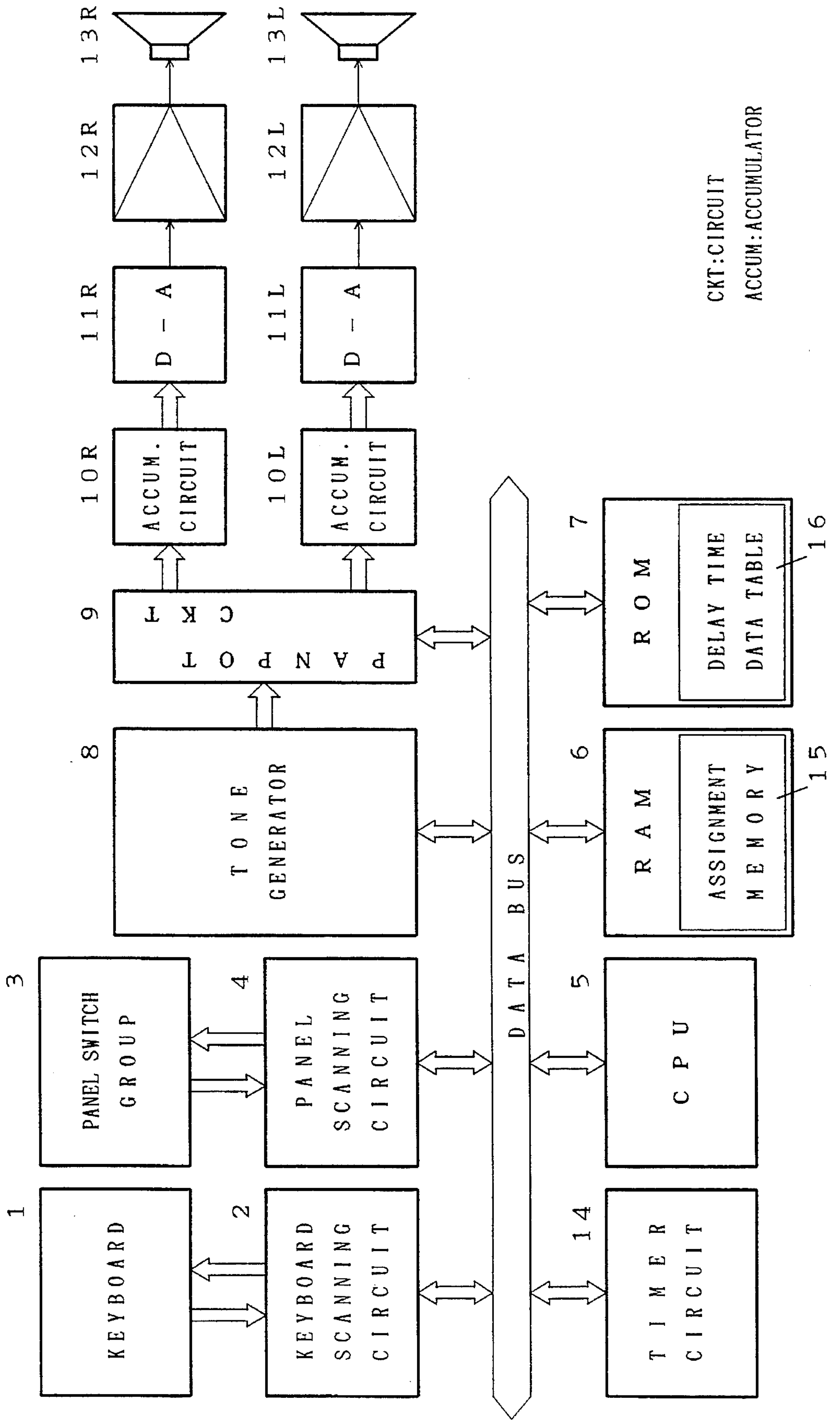
FIG. 3 is a circuit diagram of an entire electronic musical instrument.

FIG. 3 shows the construction of the entire circuit of an electronic musical instrument producing a stereophonic sound according to the present invention. Each key of a keyboard 1 is first scanned by a key scan circuit 2, and as a result, data (hereunder referred to as current data) representing a current key on or key off state of each key is detected and written to a random access memory (RAM) 6 by a central processing unit (CPU) 5. At that time, the current data is compared with data representing a key on or key off state of each key, which has been previously stored in the RAM 6, and thus the CPU 5 determines whether a key on event or a key off event has occurred at each key. An electronic stringed instrument, an electronic wind (reed) instrument, an electronic percussion (pads) instrument or a computer may be substituted for the keyboard 1.

Each switch of a panel switch group 3 is scanned by a panel scan circuit 4, and as a result, data representing a current on-state or off-state of each switch is detected and written to the RAM 6 by the CPU 5. At that time, the data is compared with data representing an on-state or an off-state of each switch, which has been previously stored in the RAM 6, and thus the CPU 5 determines whether an on-event or an off-event has occurred at each key (i.e., whether each key is turned on or off).

A tone generator 8 generates sound signals according to pitches corresponding to turned-on or depressed keys of the keyboard 1, a velocity corresponding to a key on or key off operation, and tone colors corresponding to turned-on switches of the panel switch group 3. Note, a velocity is data representing a speed or strength at which an operation of sounding a tone corresponding to each key of the keyboard 1 is performed.

In this tone generator 8, a sound generating system composed of a plurality of channels (32 channels in this embodiment) is formed by a time-sharing processing, and thus polyphonic tones can be sounded. Among the 32 channels of this sound generating system, two channels are assigned to each depressed key of the keyboard 1, for producing a stereophonic sound corresponding to each depressed key. Sound data corresponding to a right sound source is assigned to one of the two channels assigned to each depressed key, and sound data corresponding to a left sound source is assigned to the other of the two channels.

Waveform data generated and corresponding to sound data assigned to each channel are classified into waveform data (hereunder referred to as right waveform data) corresponding to a right sound source and waveform data (hereunder referred to as left waveform data) corresponding to a left sound source. A tone corresponding to right waveform data is sounded by a right loudspeaker 13R through a panpot circuit 9, a right accumulation circuit 10R, a right digital-to-analog (D/A) converter 11R, and a right amplifier 12R. In contrast, a tone corresponding to left waveform data is sounded by a left loudspeaker 13L through the panpot circuit 9, a right accumulation circuit 10L, a left D/A converter 11L, and a left amplifier 12L. The panpot circuit 9 levels up (i.e., shifts right or left) waveform data and controls the volumes of the right and the left sound sources to thereby produce stereophonic sounds.

The timer circuit 14 is used to provide a difference between a moment at which a sounding of a tone by the right sound source is initiated, and another moment at which a sounding of a tone by the left sound source is started. Delay time data is set in the timer circuit 14, and after a time represented by the delay time data has passed since a moment at which a sounding of a tone by one of the right or left sound sources is commenced, a sounding of a tone by the other sound source is started. Note, a maximum of 16 delay time data can be set in the timer circuit 14.

Programs, the flowcharts of which will be described later, for performing various processes to be executed by the CPU 5 are stored in the ROM 7, as is the delay time data table 16. Note, waveform data are stored in a waveform data memory 33 of the tone generator 8 but may be stored in the ROM 7.

Various processing data such as the above-described data are stored in the ROM 6, together with an assignment memory 15 formed therein. Data for tones assigned to the sound generating system comprised of 32 channels of the tone generator 8 are stored in the assignment memory 15. Note, the assignment memory 15 may be formed in the tone generator 8.

11-2. Assignment Memory 15

FIG. 4 shows the contents of the assignment memory 15. Storage areas for 32 channels are formed in this assignment memory 15, and data relating to tones assigned to the thirty-two sound generating channels formed in the tone generator 8 are stored in the storage areas, respectively. In this embodiment, sound data to be stored in each storage area includes on/off data, right/left data (R/L), key number data KN, tone number data TN, and velocity data VL.

The on/off data indicates an on-state (corresponding to "1") or an off-state (corresponding to "0") of each key of the keyboard 1. The right/left data R/L indicates which of the right sound source (corresponding to "1") or the left sound source (corresponding to "0") is used to sound a tone represented by the set sound data. The key number data KN indicates the pitch corresponding to each key of the keyboard 1.

The delay time data DT indicates a difference between a moment at which a sounding of a tone (hereunder referred to as a right tone) by the right sound source is initiated, and another moment at which a sounding of a tone (hereunder referred to as a left tone) by the left sound source is started. The level of a signal representing which one of the right and left tones should be sounded earlier than the other thereof is changed according to the delay time data DT. In contrast, the level of a signal representing the other of the right and left tones is not changed because the corresponding delay time data DT becomes equal to 00 . . . 0 (i.e., 0 in decimal form).

The tone number data TN represents tone colors of musical instruments such as a piano, a violin and a drum, and the velocity data VL represents a speed or strength at which an operation of sounding a tone corresponding to each key of the keyboard 1 is performed. Note, after touch data indicating an operating pressure may be substituted for the velocity data.

1-3. Delay Time Data Table 16

Figure 5:
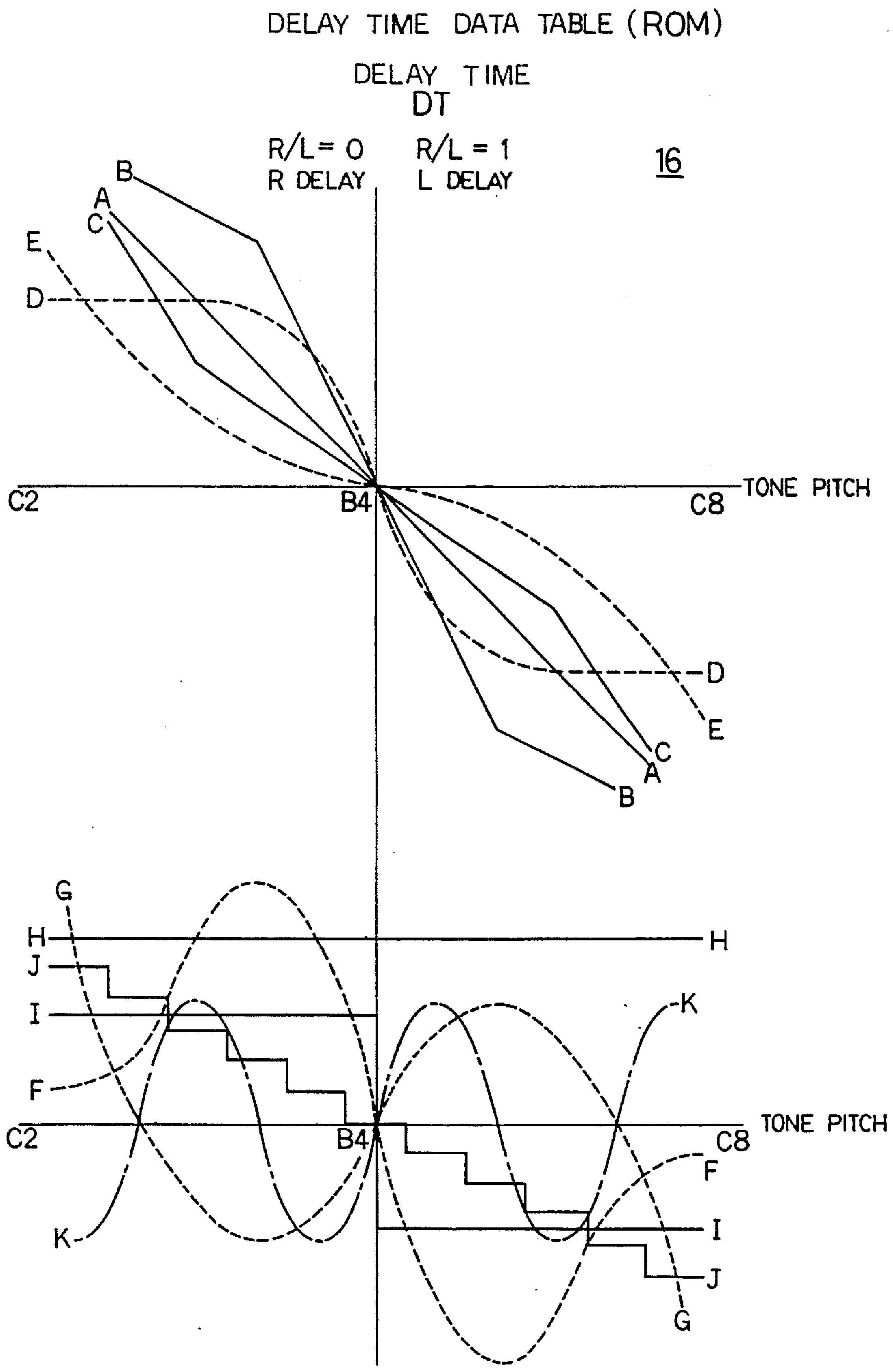
FIG. 5 is a diagram illustrating the contents of a delay time data table 16.

FIG. 5 shows the contents of the delay time data table 16 stored in the ROM 7. As described above, the delay time data DT indicates a difference between a moment at which a sounding of a right tone by the right sound source is initiated, and another moment at which a sounding of a left tone by the left sound source is started. The value indicated by the delay time data DT varies with the pitch of the corresponding tone. Namely, as the pitch changes from C5 to C8, the value indicated the corresponding delay time data increases, and as the pitch changes from B5 to C2, the value indicated the corresponding delay time data increases. When the pitch changes from C5 to C8, the delay time data DT corresponds to a case where the sounding of the left tone lags behind that of the right tone. Conversely, when the pitch changes from B5 to C2, the delay time data DT corresponds to a case where the sounding of the right tone lags behind that of the left tone. As a result, musical tones C2–C8 corresponding to keys of the keyboard 1 are heard from over a wide range from the left and right directions, whereby stereophonic sounds are realized. Note, FIG. 5 illustrates the delay time data DT by regarding the right/left data (R/L) as MSB sign bit data which indicates a positive sign if the R/L=0, and a negative sign if the R/L=1.

"A" of FIG. 5 is a graph illustrating the delay time data of the type represented by a linear function proportional to pitch data. In the case of this type of data, sound images corresponding to pitches are arranged from left to right in pitch order.

"B" of FIG. 5 is a graph illustrating the delay time data of the type represented by a broken line, the gradient of which is large with regard to a central sound image. Therefore, compared with the case shown in "A" of FIG. 5, sound images of the case shown in "B" of FIG. 5 are shifted to the left or to the right.

"C" of FIG. 5 is another graph illustrating the delay time data of the type represented by a broken line, the gradient of which is small with regard to a central sound image. Therefore, compared with the case shown in "A" of FIG. 5, sound images of the case shown in "C" of FIG. 5 are shifted to a center point between the left sound source and the right sound source.

"D" of FIG. 5 is a graph illustrating the delay time data of the type represented by an upwardly convex curve, as in the case shown in "B" of FIG. 5. As the pitch is increased or reduced, the gradient becomes smaller. Therefore, compared with the case shown in FIG. 5B, sound images change more smoothly according to the pitch. Further, where the pitch is higher than or equal to a predetermined value, or is lower than or equal to another predetermined value, the sound images are substantially unchanged.

"E" of FIG. 5 is a graph illustrating the delay time data of the type represented by a downwardly convex curve as in the case shown in "C" of FIG. 5, which may be expressed by a quadratic function, a cubic function or a higher order derivative. As the pitch is increased or reduced, the gradient becomes smaller. Therefore, compared with the case shown in "C" of FIG. 5, sound images change more smoothly according to the pitch.

"F" of FIG. 5 is a graph illustrating the delay time data of the type represented by another curve. In comparison with the graph of "D" of FIG. 5, as the pitch becomes larger or smaller, the gradient becomes inverted and smaller, and thus the value of the delay time data approaches 0. Therefore, in the case shown in "F" of FIG. 5, sound images are shifted farthest to the left or to the right at peak and bottom points. Further, sound images are shifted to the center when the pitch becomes smaller than that corresponding to the peak point and larger than that corresponding to the bottom point.

"G" of FIG. 5 is a graph illustrating the delay time data of the type represented by another curve. Compared with the graph of FIG. 5F, the sign is substantially inverted and therefore, as the pitch becomes lower, the value indicated by the delay time data DT increases, and as the pitch becomes higher, the value indicated by the delay time data DT is reduced. Namely, in the case shown in "G" of FIG. 5, as the pitch changes from a low pitch to a high pitch, sound images corresponding to pitches are first arranged from left to right in sequence. Also, when a sound image corresponding to a pitch is arranged at a point located at the right side of the center, sound images corresponding to subsequent pitches are then arranged at the left, in sequence from such a point. Thereafter, when a sound image corresponding to another pitch is arranged at a point located at the left side of the center, sound images corresponding to subsequent pitches are arranged at the right, in sequence from such a point. Note, broken lines may be substituted for the curves of "F" and "G".

"H" of FIG. 5 is a graph illustrating the delay time data of the type represented by a horizontal line. In this case, the delay time data DT is constant regardless of the pitch, and thus the position of a sound image corresponding to each pitch is fixed independently from the pitch. Note, this also applies to the delay time data obtained by performing a given upward or downward parallel displacement of the graph of "H" of FIG. 5.

"I" of FIG. 5 is a graph illustrating the delay time data of the type represented by a step function. Namely, the delay time data corresponding to pitches higher than or equal to a first pitch have a negative constant value, and the delay time data corresponding to pitches lower than or equal to a second pitch have a positive constant value. Accordingly, sound images corresponding to pitches lower than or equal to the first pitch are placed at a position located at the left side of the center and sound images corresponding to pitches higher than or equal to the second pitch are placed at a position located at the right side of the center.

"J" of FIG. 5 is a graph illustrating the delay time data of the type represented by another step function. In this case, the delay time data corresponding to pitches of each range (i.e., each octave) have a constant value, and thus, each time the pitch becomes higher by an octave, the position of the sound image corresponding to the pitch is changed by a corresponding interval.

"K" of FIG. 5 is a graph illustrating the delay time data PT, the value of which is changed in a sine wave-like manner with respect to the pitch. In this case, as the pitch becomes higher, the sound image corresponding to the pitch is periodically shifted to the left and to the right. Note, a trapezoid wave, a square wave, a chopping wave, a sawtooth wave or a step-like modification of each of such waves may be substituted for the sine wave of "K" of FIG. 5.

In addition to the cases shown in "A"–"K" of FIG. 5, the delay time data DT may be represented by an algebraic function, an exponential function, a logarithmic function, a hyperbolic function, an arc-hyperbolic function, a trigonometrical function or an inverse trigonometrical function. Further, the delay time data DT may be represented by a graph obtained by performing a given upward or downward parallel displacement of any one of the graphs of "A"–"K" of FIG. 5. Moreover, the delay time data DT may be represented by a graph obtained by performing a given upward or downward parallel displacement of a right or left half of any one of the graphs of "A" to "K" of FIG. 5. Furthermore, the delay time data DT may be represented by a graph obtained by performing a given leftward or rightward parallel displacement of an Upper or lower half of any one of the graphs of "A"–"K" of FIG. 5. In addition, the delay time data DT may be represented by a graph having a symmetric relationship with any one of the graphs of "A"–"K" of FIG. 5, with respect to a vertical line or a horizontal line. Further, the delay time data DT may be represented by a graph obtained by performing a symmetric transformation of a right half or a left half of any one of the graphs of "A"–"K" of FIG. 5, with respect to a vertical line or a horizontal line. Moreover, the delay time data DT may be represented by a graph obtained by performing a symmetric transformation of an upper half or a lower half of any one of the graphs of FIGS. 5A to 5K, with respect to a vertical line or a horizontal line.

Note, the delay time data DT may be adapted to change according to octaves (or ranges), tone colors, a velocity, musical tone parts, effects, modulations, volumes or tempos other than pitches. Namely, the delay time data DT may be determined according to the tone colors of a piano, a violin, drums, and so on as illustrated in each graph of FIG. 5. The delay time data DT adapted to change according to a velocity may be determined on the basis of a speed or strength of a key touch operation, as illustrated in each graph of FIG. 5. Further, the delay time data DT may be determined according to the musical tone parts such as a melody part, a chord part, a bass part, a drum part, a backing part, an arpeggio part and an external input MIDI (Musical Instrument Digital Interface) data part, as illustrated in each graph of FIG. 5.

The value indicated by the delay time data DT adapted to change according to effects is determined on the basis of the magnitude of the effects, as illustrated in each graph of FIG. 5. Further, the value indicated by the delay time data DT adapted to change according to a modulation is determined on the basis of the magnitude of the modulation, as illustrated in each graph of FIG. 5. Moreover, the value indicated by the delay time data DT adapted to change according to a volume is determined on the basis of the volume, as illustrated in each graph of FIG. 5. Furthermore, the value indicated by the delay time data DT adapted to change according to a tempo is determined on the basis of the tempo, as illustrated in each graph of FIG. 5.

The delay times respectively corresponding to the right sound source and the left sound source may be determined on the basis of the delay time data DT obtained in the above-described manner or on the basis of addition delay time data obtained by adding the delay time data DT respectively determined according to octaves (or ranges), tone colors, a velocity, musical tone parts, effects, modulations, volumes and tempos.

Note, instead of using the delay time data DT stored in the ROM 7, the delay time data DT can be obtained by calculating one of the following expressions:

$$DT=a\ (KD-b);\ DT=a\ (b-KD);\ DT=a\ (KD)^2+b:\ DT=\sin\{a\ (KD)+b\};\ DT=\tan\{a\ (KD)+b\};\ DT=\sinh\{a\ (KD)+b\};\ DT=\tanh\{a\ (KD)+b\}:\ DT=b/\{a\ (KD)\}:\ DT=a^{KD}+b;\ \text{and}\ DT=\log_a\{(KD)+b\}$$

where "a" denotes a constant; KD the value indicated by key number data KN; and "b" the value indicated by the key number data corresponding to the pitch BS. Moreover, the delay time data DT corresponding to each range, tone color, or musical tone part may be input by a player through a ten-key pad, and in such a case, the input delay time data DT is stored in the RAM 6.

1-4 Timer Circuit 14

Figure 6:
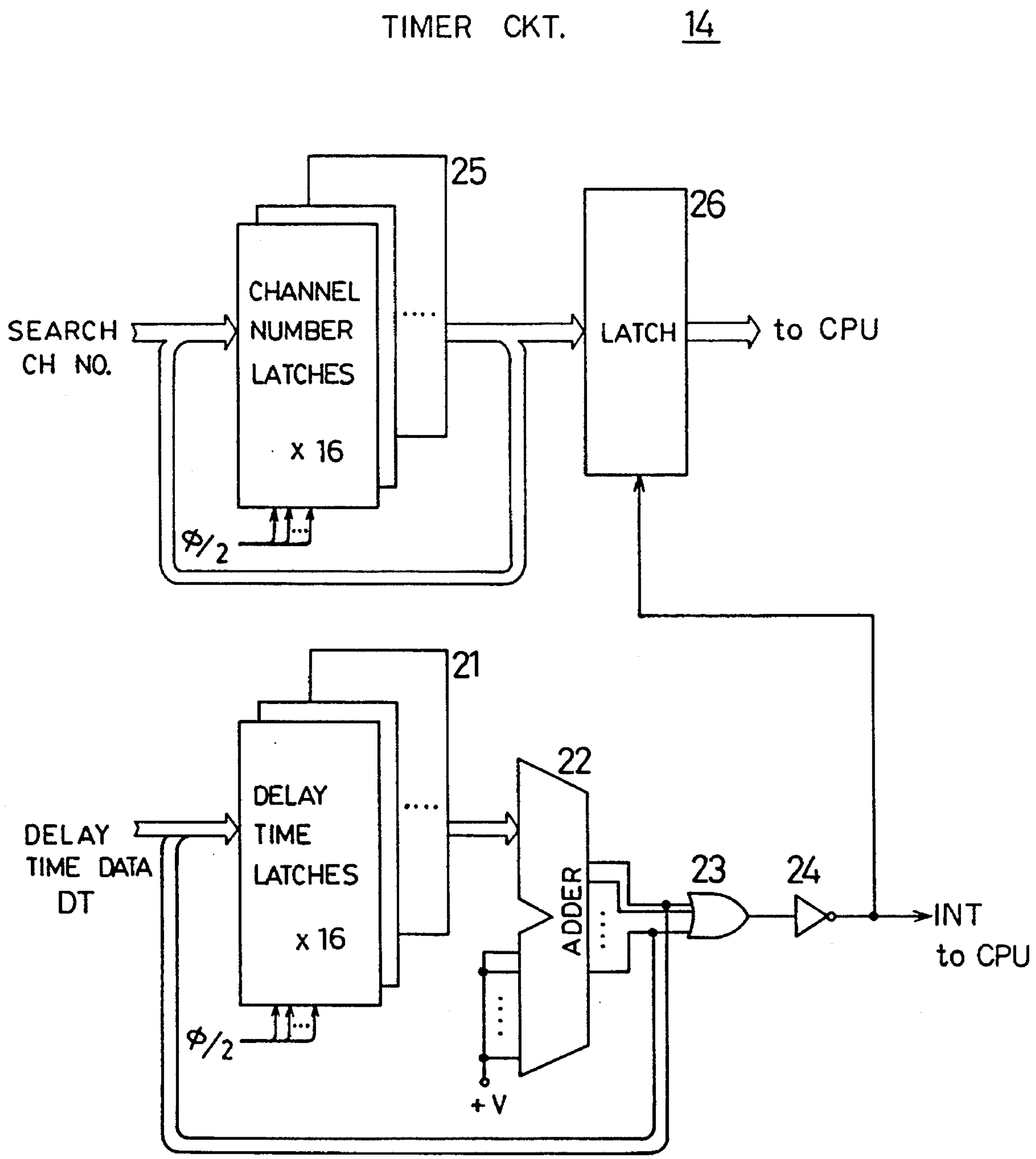
FIG. 6 is a schematic block diagram illustrating the construction of a timer circuit 14.

FIG. 6 shows the construction of the timer circuit 14. A delay time latch group 21 is composed of 16 latches. When a key on event occurs among the keys of the keyboard 1, delay time data DT corresponding to the turned-on key is set and shifted serially in response to a clock signal (ø/2) having a period which is one-half the period of another clock signal ø used for determining each channel operation performed in the tone generation 8.

The delay time data DT shifted by the latches placed at a first stage to the last stage of the delay time latch group 21 is added to 11. . . 1 (namely, is decremented by 1) by an adder 22, and the resultant data is fed back to the latch placed at the first stage of the group 21. The fed-back delay time data DT is input to an inverter 22 through an OR-gate 23, and each bit of the fed-back delay time data is inverted by the inverter 24. Then, a signal representing the result of the inversion is output from the inverter 24 to the CPU 5 as an interrupt signal INT, and accordingly, the OR-gate 23 and the inverter 24 detect that the delay time data DT has become equal to 0 (i.e., a lapse of the time indicated by the delay time data DT), and the interrupt signal INT is output by the inverter.

A channel number latch group 25 includes 16 latches. When a key on event occurs among the keys of the keyboard 1, data indicating the channel number of a channel to which the tone corresponding to the turned-on key is assigned is set and shifted serially in response to the clock signal (ø2). Note, the data indicating the channel number is set substantially simultaneously with the setting of the delay time data DT in the delay time latch group 21.

The data indicating the channel number shifted by the latches placed at a first stage to the last stage of the channel number latch group 25 is fed back to the latch placed at the first stage of the group 25, without change. Further, when the interrupt signal INT is output from the inverter 24, the data indicating the channel number, which is shifted by the latch of the last stage of the group 25, is input to a latch 26, and thereafter, is sent to the CPU 5. Accordingly, sound data corresponding to the channel number and stored in the assignment memory 15 is copied to another empty channel storage area of the assignment memory 15, as will be described later. At that time, the bit of the right/left data (R/L), which is one or zero, is inverted.

1-5 Tone Generator 8 and Panpot Circuit 9

Figure 7:
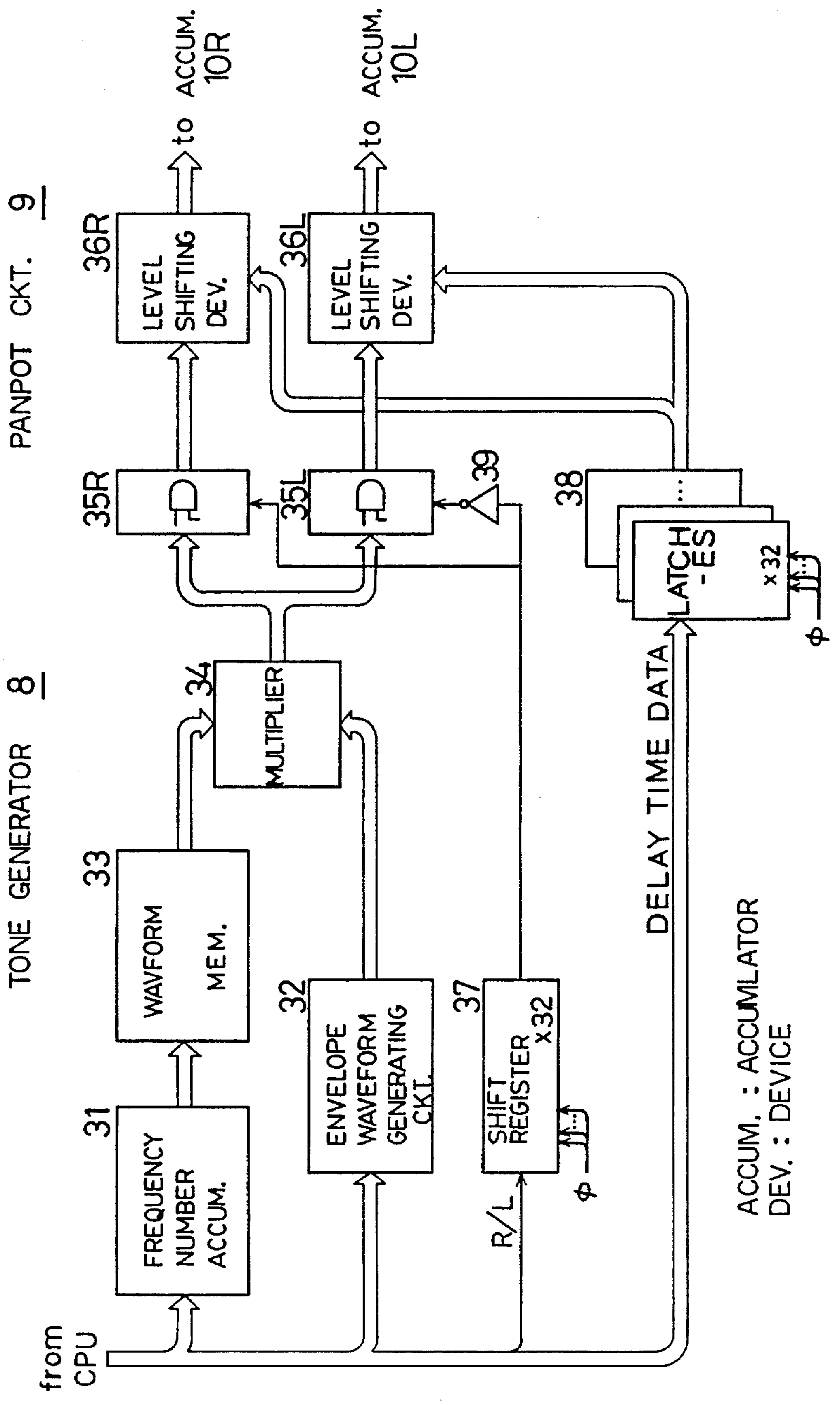
FIG. 7 is a schematic block diagram illustrating the construction of a tone generator 8.

FIG. 7 illustrates the configurations of the tone generator 8 and the panpot circuit 9. The sound data written to each channel storage area of the assignment memory 15 is read therefrom at each channel time and converted into a read waveform indicating data and generated envelope indicating data, which are then sent to a frequency number accumulator 31 and an envelope waveform generating circuit 32 of the tone generator 8.

The read waveform indicating data is composed of initial frequency number data indicating a leading address of waveform data to be read among a plurality of waveform data, loop top address data (hereunder sometimes referred to as loop top data) and loop end address data (hereunder sometimes referred to as loop end data) respectively indicating a top address and an end address of a storage area of the waveform data to be repeatedly read, and frequency number data corresponding to the key number data KN. A plurality of the read waveform indicating data is stored in the ROM 7, corresponding to each of the tone number data TN, range data (i.e., upper part of the key number data KN) and the velocity data VL. Further, the read waveform indicating data corresponding to the tone number data TN, the key number data KN and the velocity data VL of each of the sound data stored in the assignment memory 15 are selectively read and written to a read waveform indicating data memory 47 of the frequency number accumulator 31. The frequency number data are accumulated in the frequency number accumulator 31, and the accumulated frequency number data is sent to the waveform memory 33 and the waveform data then read therefrom.

The generated envelope indicating data is used to determine the level and rate of each of the attack, decay, sustain and release phases. The generated envelope indicating data is also stored in the ROM 7, corresponding to each of the tone number data TN, the range data (i.e., the upper part of the key number data KN) and the velocity data VL. Further, the generated envelope indicating data corresponding to the tone number data TN, the key number data KN and the velocity data VL of each of the sound data stored in the assignment memory 15 are selectively read and written to a memory of the envelope waveform generating circuit 32. The envelope waveform data corresponding to the generated envelope indicating data are generated in the envelope waveform generating circuit 32.

The envelope waveform data is multiplied by the waveform data in a multiplier 34, and the result of the multiplication is input to level shifting devices 36R and 36L of the panpot circuit 9, through AND-gate groups 35R and 35L, respectively, and is shifted up in the shifting devices 36R and 35L. Thereafter, the resultant data are respectively sent from the shifting devices 36R and 36L to the accumulating circuit 10R and 10L of FIG. 3, and the corresponding tones are sounded.

Further, among the sound data to be sent from the assignment memory 15 to the tone generator 8, the right/left data (R/L) is set in a shift register 37 having 32 stages. After a sharing time of 32 channels has passed, a signal representing the result of the shifting of the data R/L is sent to the AND-gate group 35R, without change, as an enabling signal, and further, the result of the shifting of the data R/L is inverted by the inverter 39. Then a signal indicating the result of the inversion is sent to the AND-gate group 35L as an enabling signal, and thus the generated waveform data are distributed to the right sound source and the left sound source.

Moreover, among the sound data to be sent from the assignment memory 15 to the tone generator 8, the delay time data DT is set in a latch group 38 having 32 stages. After a sharing time of 32 channels has passed, a signal representing the delay time data DT is sent to the shifting devices 36R and 36L, which shift up the waveform data according to the value indicated by the delay time data DT, of the panpot circuit 9, as shifting data. A multiplier may be substituted for each of the shifting devices 36R and 36L. Therefore, the waveform data is leveled up according to the delay time data DT, and the volume of a sound radiated from each of the right and left sound sources is adjusted. Note, the shifting devices 36R and 36L may shift down the waveform data according to the value indicated by the delay time data DT.

1-6. KEY PROCESSING

FIGS. 1 and 2 illustrate flowcharts of a program for performing a stereophonic sound assignment processing and a program for performing a key processing, respectively. The key processing of FIG. 2 composes an entire processing together with an initialization processing and a panel switch processing, the entire processing being started when power is turned on. The stereophonic sound assignment processing of FIG. 1 is performed as an interrupt processing when an interrupt signal INT is sent from the timer circuit 14 to the CPU 5.

In the key processing of FIG. 2, the CPU 5 determines from an output of the key scan circuit 2 in step 01 whether or not a key event has occurred. If it is found in step 02 that this key event is a key on event, the assignment memory 15 is searched in step 03 for an empty or idle channel. This is effected by searching the assignment memory 15 for a channel storage area in which the on/off data is 0 (i.e., an off-state). When effecting this search, the channel numbers searched are counted at a specific address of the RAM 6.

If an idle channel is found, delay time data DT corresponding to the key number data KN, which represents the key number of the turned-on key, is read in step 04 from the delay time data table 16 of FIG. 5 stored in the ROM 7. Subsequently, in step 05 it is determined whether or not the value indicated by the key number data KN is larger than or equal to that indicated by key number data KN corresponding to the Ditch C5. If larger than or equal to the value indicated by the data KN corresponding to the pitch C5, the data R/L is set to 1 in step 06 (corresponding to the right sound source). If less than the value indicated by the data KN corresponding to the pitch C5, the data R/L is set to 0 in step 07 (corresponding to the left sound source).

Then, the key number data KN, the delay time DT, the right/left data (R/L), the on-off data indicating 1, the velocity data VL, and the tone number data TN are written in step 08 to a searched channel storage area of the assignment memory 15, and accordingly, the read waveform indicating data and the generated envelope indicating data corresponding to the key number data KN, the velocity data VL, and the tone number data TN are sent to the frequency number accumulator 31 and the envelope waveform generating circuit 32. Thus a sounding of the one of the right and left tones composing the stereophonic sound which should be sounded earlier is commenced. Thereafter, the channel number data and the delay time data DT stored in the RAM 16 are set in the timer circuit 14 in step 09.

Therefore, when a time corresponding to the delay time data DT set in the timer circuit 14 has passed, the interrupt signal INT is sent from the timer circuit 14 to the CPU 5, and the CPU 5 then carries out the stereophonic sound assignment processing of FIG. 1.

1-7. Stereophonic Sound Assignment Processing

In this processing of FIG. 1, first the CPU 5 searches the assignment memory 15 for an empty or idle channel in step 21, as in step 03, and if an idle channel is found, sound data corresponding to the channel number data sent from the timer circuit 14 is copied from the assignment memory 15 to an empty address of the RAM 6 in step 22. The contents of the data R/L (i.e., 1 or 0) are inverted, and thus a tone to be sounded is changed to the other of the right and left tones composing the stereophonic sound in step 23. Then, the delay time data DT is changed to 00 . . . 0 (i.e., 0 in decimal form) in step 24, and thereafter, the thus-changed sound data is written to an idle channel storage area in step 25.

Accordingly, the read waveform indicating data and the generated envelope indicating data corresponding to the key number data KN, the velocity data VL, and the tone number data TN are sent to the frequency number accumulator 31 and the envelope waveform generating circuit 32, and thus a sounding of the other and left tones composing the stereophonic sound which should be sounded later of the right is commenced after the time indicated by the delay time data DT has passed since the sounding of the tone which should be sounded earlier. Further, the sound level of the tone which should be sounded earlier is increased according to the delay time data DT. In contrast, the delay time data DT corresponding to the tone which should be sounded later is 00 . . . 0 (i.e., 0 in decimal form), and thus the sound level of the tone is not changed, and therefore, the volumes of the right and left tones composing the stereophonic sound are controlled.

If it is found in step 02 that the key event is not a key on event, but instead, it is found in step 11 that the key event is a key off event, channels to which right and left tones corresponding to the key off event are assigned are searched for in step 12, and the on/off data respectively corresponding to the right and left tones are then changed to 0 (corresponding to off-states thereof) in step 13. The key off processings respectively corresponding to the right and left tones may be performed separately from each other, but no problem arises from an auditory point of view even when such key off processings are performed simultaneously, as in this embodiment.

Note, instead of storing the data R/L and DT in the assignment memory 15, the data R/L and DT may be read from the time data table 16 and sent to the frequency number accumulator 31 and the envelope waveform generating circuit 32 at the same time as the read waveform indicating data and the generated envelope indicating data are sent to the accumulator 3 and the circuit 32. In this case, when such data are sent to the frequency number accumulator 31, the envelope waveform generating circuit 32 and the latch group 38, the operations of steps 04 to 07, 09 and 22 to 24 are carried out.

2. Second Embodiment

Figure 8A:
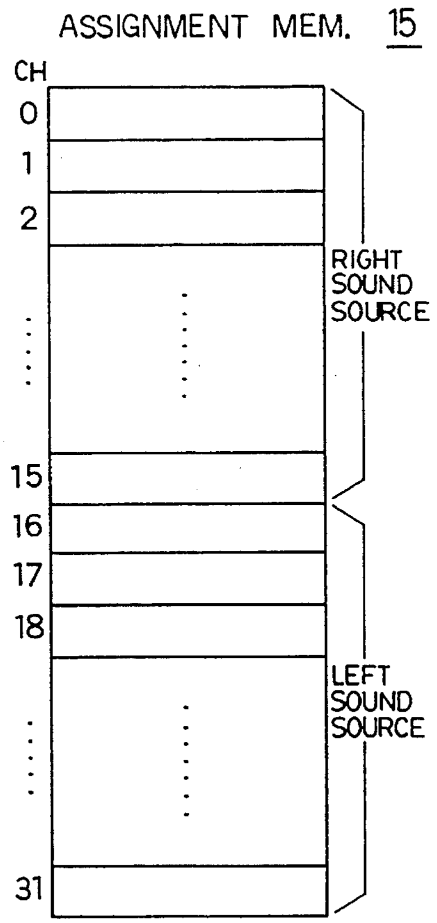
FIG. 8A and 8B is a schematic block diagram illustrating the contents of an assignment memory 15 of a second embodiment and the construction in a tone generator 8 thereof.
Figure 8B:
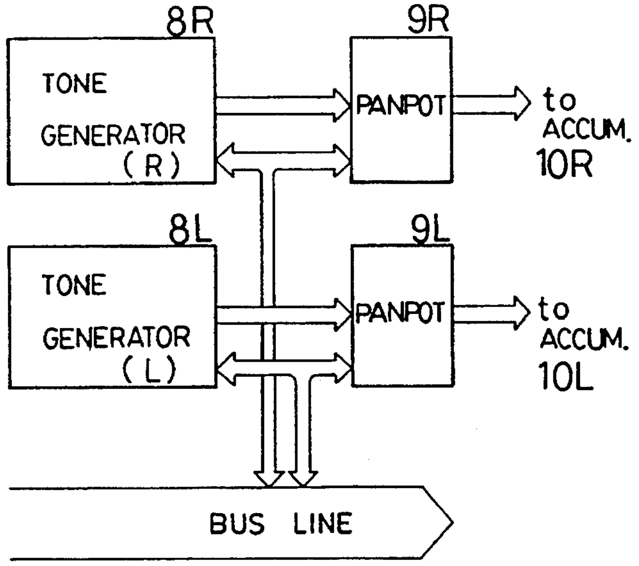

Next, a second embodiment of the present invention will be described with reference to FIGS. 8A, 8B, 9 and 10. In this embodiment, the sound generating system is divided into a sub-system for the right sound source and another sub-system for the left sound source. As shown in FIG. 8B, two tone generators 8, i.e., a right tone generator 8R and a left tone generator 8L, are provided in this embodiment. Further, as shown in FIG. 8A, the storage areas of the assignment memory 15 are divided into two portions, i.e., sound data assigned to the right tone generator 8R are stored in storage areas corresponding to channels 0 to 15, and sound data assigned to the left tone generator 8L are stored in storage areas corresponding to channels 16 to 31. Further, the right and left tones corresponding to a first stereophonic sound are assigned to channels 0 and 16, respectively, and the right and left tones corresponding to a second stereophonic sound are similarly assigned to channels 1 and 17, respectively, whereby the right and left tones of other second stereophonic sounds are assigned to the channels. Finally, the right and left tones corresponding to a sixteenth stereophonic sound are assigned to channels 15 and 31, respectively. Moreover, the panpot circuit 9 is divided into a right panpot circuit 9R and a left panpot circuit 9L, and each of the right and left panpot circuits 9R and 9L includes a level shifting device and a latch group having 16 latches.

Further, as illustrated in FIG. 9, the right/left data R/L, the delay time data DT, right panpot data PNr, and left panpot data PNl corresponding to each key number represented by the key number data KN, or corresponding to each range or compass, are stored in the delay time data table 16. The data R/L and DT are the same as in the first embodiment. The right panpot data PNr and the left panpot data PNl represent level control quantities of waveform data in the panpot circuits 9R and 9L, and thus the volumes of sounds from the right and left sound sources are controlled independently of each other.

Figure 10:
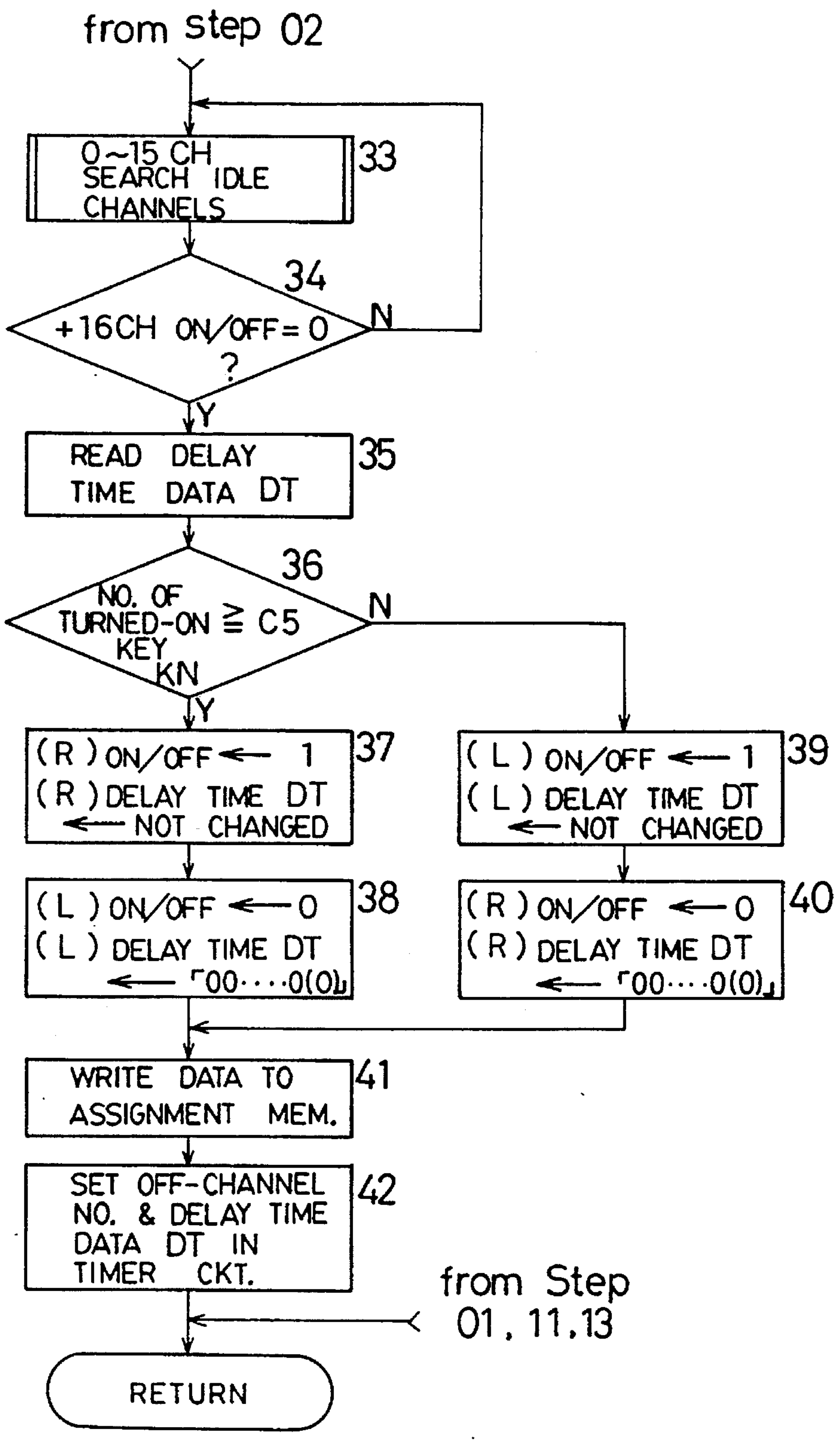
FIG. 10 is a flowchart of a program for performing a key processing in the second embodiment.

The processing to be performed in this embodiment after step 03 of FIG. 2 is as illustrated in FIG. 10. First, in step the channels 0 to 15 are searched for a channel corresponding to the on/off data having a value of 0. Then, in step 34 it is determined whether or not the value indicated by the on/off data corresponding to a channel having a channel number greater than that of the channel found in step 33, by 16, is equal to 0. If this is equal to 0, then a pair of idle channels to which right and left tones of a stereophonic sound are respectively assigned have been found. Conversely, if this is equal to 1, the search process is continued.

When the pair of idle channels are found, the delay time data PT, the right panpot data PNr and the left panpot data PNl corresponding to the key number data KP4, which corresponds to the turned-on key, are read from the delay time data table 16 of the ROM 7 in step 35. If it is found in step 36 that the key number data KN corresponding to the turned-on key is larger than or equal to the KN corresponding to the pitch C5, the on/off data corresponding to the right sound source is set to 1 and the corresponding right panpot data PNr is read out in step 37. Then, the on/off data corresponding to the left sound source is set to 0 and the corresponding left panpot data PNl is read out in step 38. Moreover, as in step 08, this data are written to searched channel storage areas of the assignment memory 15, together with the key number data KN, the velocity data VL and the tone number data TN, in step 41.

In this case, the right panpot data PNr is written to a group of latches of the right panpot circuit 9R, and the left panpot data PNl is written to a group of latches of the left panpot circuit 9L, and accordingly, the read waveform indicating data and the generated envelope indicating data corresponding to the key number data KN, the velocity data VL, the tone number data TN are sent to the frequency number accumulator 31 and the envelope waveform generating circuit 32. Thus a sounding of one of the right and left tones composing the stereophonic sound, which should be sounded earlier, is started.

Thereafter, the delay time data DT read out in step 35 and the channel number data corresponding to the corresponding on/off data set in step 38 to 0 are set in the timer circuit 14 in step 42.

Further, if a time indicated by the delay time data DT has passed and an interrupt signal INT is sent to the CPU 5, the value indicated by the on/off data of the channel storage area of the assignment memory 15 corresponding to the channel number represented by the channel number data sent from the timer circuit 14 is changed from 0 to 1, and accordingly, the read waveform indicating data and the generated envelope indicating data corresponding to the key number data KN, the velocity data VL, the tone number data TN are sent to the frequency number accumulator 31 and the envelope waveform generating circuit 32. Consequently, a sounding of one of the right and left tones composing the stereophonic sound, which should be sounded later, is started after a time indicated by the delay time data DT has passed since the sounding of the one of the right and left tones, which should be sounded earlier, is started.

Note, if it is found in step 36 that the key number data KN corresponding to the turned-on key is less than the KN corresponding to the pitch C5, the following processing is performed. Namely, in step 39, the on/off data corresponding to the left sound source is set to 1 and the left panpot data PNl is read out. Then, in step 40, the on/off data corresponding to the right sound source is set to 0 and the right panpot data PNl is read out. Subsequently, as in step 08, these data are written to the searched channel storage areas of the assignment memory 15 in step 41, together with the key number data KN, the velocity data VL and the tone number data TN.

In this case, the right panpot data PNr is written to a group of latches of the right panpot circuit 9R, and the left panpot data PNl is written to a group of latches of the left panpot circuit 9L. The remaining construction and operations of this embodiment are the same as those of the first embodiment. Note, in the second embodiment, the data R/L of the assignment memory 15, the AND-gate groups 35R ad 35L, the inverter 39, and the shift register 37 can be omitted.

Note, as in the first embodiment, instead of storing the data DT in the assignment memory 15, the data DT may be read from the time data table 16 and sent to the frequency number accumulator 31 and the envelope waveform generating circuit 32 at the same time as the read waveform indicating data and the generated envelope indicating data are sent to the accumulator 3 and the circuit 32. In this case, when such data are sent to the frequency number accumulator 31 and the envelope waveform generating circuit 32, the operations of steps 35 to 40, 42 and 22 to 24 are carried out, and further, the reading of the right and left panpot data PNr and PNl, as well as the writing of the data PNr and PNl to the group of latches, is effected.

Instead of dividing the channel storage areas of the assignment memory 15 into a group of storage areas corresponding to channels 0 to 15 and another group of storage areas corresponding to channels 16 to 31, and combining a pair of channels 0 and 16, another pair of channels 1 and 17 . . . and still another pair of channels 15 and 31, the storage areas may be divided into two groups, in a different manner, and different combinations of the channels may be employed. In this case, one of the two groups of channels is searched for an idle channel in step 33, and then the other group of channels is searched in step 34 for an idle channel to be combined with the idle channel detected in step 33. Further, the channel numbers of the channels respectively found in steps 33 and 34 are set in the timer circuit 14 in step 42.

3. Third Embodiment

Figure 11:
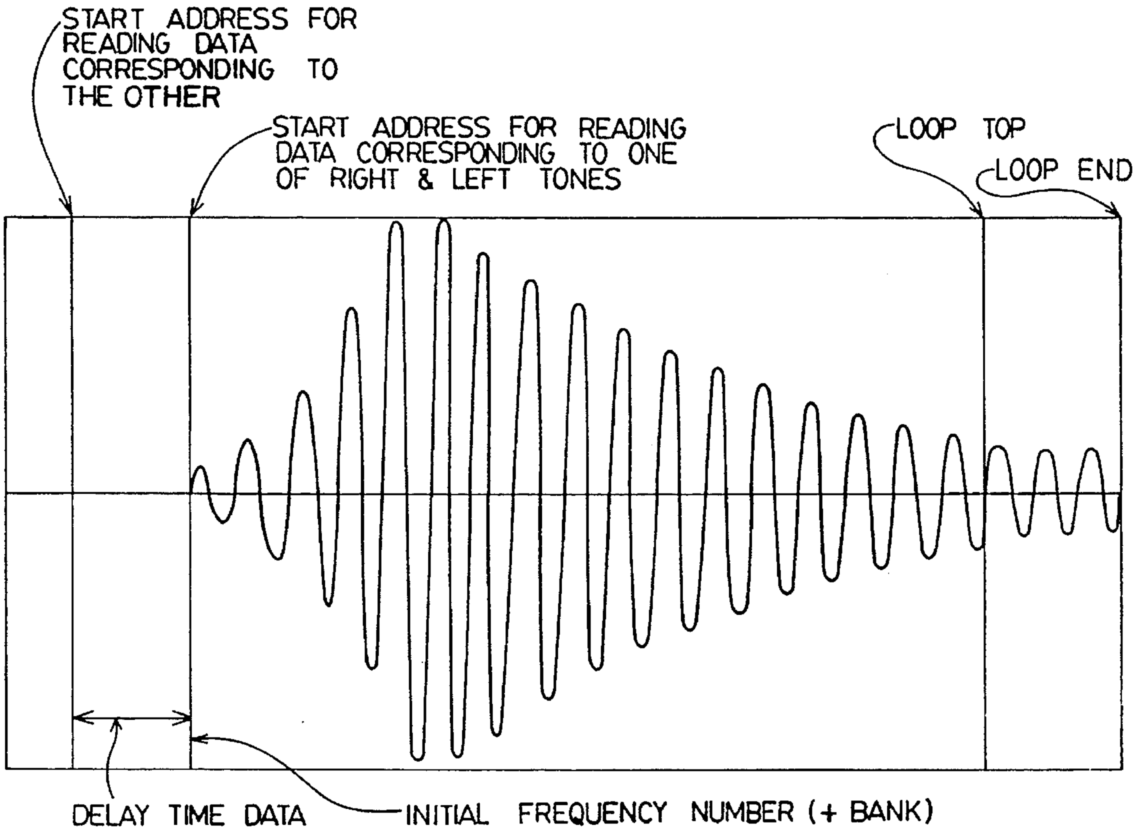
FIG. 11 is a waveform chart illustrating waveform data to be stored in a waveform memory 33 of a third embodiment.

FIG. 11 is a diagram for illustrating a third embodiment of the present invention. In this embodiment, a soundless section as illustrated in FIG. 11 is formed prior to a leading or top address of waveform data stored in the waveform memory 33. Further, waveform data corresponding to one of right and left tones composing a stereophonic sound, which should be sounded earlier than the other, is read from the top address thereof. Regarding waveform data corresponding to the other tone which should be sounded later, however, data stored in the soundless section is read prior to the waveform data corresponding thereto. Note, a time required for reading the data stored in the soundless section is determined on the basis of delay time data DT.

In this case, the delay time data DT of a delay time data table 16 of a ROM 7 indicates the value of address data proportional to the length of the soundless section to be read. Further, in the processing to be performed after steps 37, 38 and 41, the initial frequency number of sound data corresponding to the right sound source is written to a read waveform indicating data memory 47, without change. In contrast, the value indicated by the delay time data DT is subtracted from the initial frequency number of sound data of the left sound source, and the result of this subtraction is written to the memory 47. Moreover, in the processing to be performed after steps 39, 40 and 41, the initial frequency number of sound data corresponding to the left sound source is written to the read waveform indicating data memory 47 without change. In contrast, the value indicated by the delay time data DT is subtracted from the initial frequency number of sound data of the right sound source, and the result of this subtraction is written to the memory 47. Note, in the second embodiment, the on/off data having a value of 0 is written to the memory in steps 38 and 40, but in the third embodiment, the on/off data having a value of 1 is written to the memory in steps 38 and 40.

In the third embodiment, the timer circuit 14 of FIGS. 3 and 6, the processing of step 42 of FIG. 10, and the stereophonic sound assignment processing of FIG. 1 become unnecessary. Note, the program can be changed such that it advances to step 35 after two idle channels are searched for in step 03, and right and left tones are assigned to the found two channels in steps 37 and 38 (or steps 39 and 40), and this allows an additional tone generator to be omitted.

4. Fourth Embodiment

Figure 12:
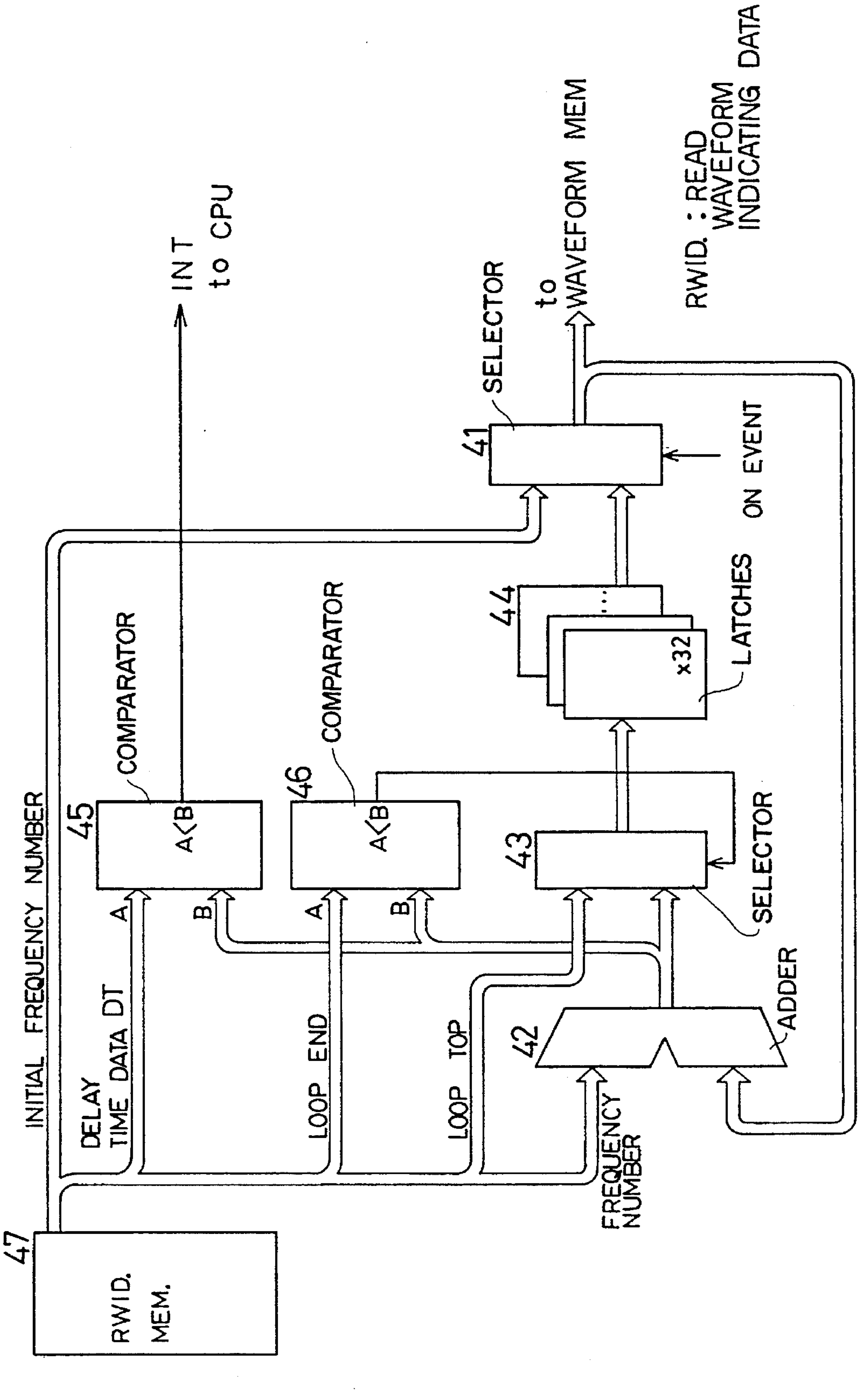
FIG. 12 is a schematic block diagram illustrating the construction of a frequency number accumulator 31 of a fourth embodiment.

FIG. 12 illustrates the construction of a frequency number accumulator 31 of a fourth embodiment of the present invention. In this embodiment, waveform data corresponding to one of right and left tones composing a stereophonic sound, which should be sounded earlier than the other, is first read. When the waveform data of a quantity indicated by the delay time data DT is read out (i.e., the accumulated frequency number data exceeds the delay time data DT), a sounding of the other of the right and left tones is started.

Frequency number data is added by an adder 42, through a selector 41, to initial frequency number data written to the read waveform indicating data memory 47 when a key on event occurs, and the result of the addition is set in a group of latches 44 through a selector 43. This group of latches is comprised of 32 latches, and the data set in this group of the latches is shifted serially in response to a clock signal ø, which is a channel timing signal. Thus, in each sharing time corresponding to 32 channels, the frequency number data is accumulated serially by using the value indicated by the initial frequency number data as an initial value thereof.

Further, the delay time data DT written to the read waveform indicating data memory 47 is sent to a comparator 45, to which the accumulated frequency number data is also sent from the adder 42. If the accumulated frequency number data exceeds the delay time data DT, a comparison signal is output from the comparator to the CPU 5 as an interrupt signal INT, and in response to this signal, the CPU 5 performs the stereophonic sound assignment processing of FIG. 1, and the sounding of the other of the right and left tones which should be sounded later is started.

When effecting the stereophonic sound assignment processing of FIG. 1, a channel storage area, the contents of which should be copied in step 22, is in agreement with a channel storage area having a channel number which is equal to the channel number of a processing channel at that time. The technique of this embodiment can be applied to the second embodiment by effecting the following processing. Namely, when the interrupt signal INT is input from the right tone generator 8R, the on/off data of a channel storage area corresponding to a channel number obtained by adding 16 to the channel number of the processing channel at that time is changed from 0 to 1. In contrast, when the interrupt signal INT is input from the left tone generator 8L, the on/off data of a channel storage area corresponding to a channel number obtained by subtracting 16 from the channel number of the processing channel at that time is changed from 0 to 1.

Loop end data read out of the assignment memory 15 is sent to a comparator 46, to which the accumulated frequency number data is also sent from the adder 42. If the accumulated frequency number data exceeds the loop end data, a comparison signal is sent to the selector 43, and thus the accumulated frequency number data are accumulated serially by returning an address of waveform data to be read from an address indicated by the loop end data to an address indicated by the loop top data. In the fourth embodiment, the timer circuit 14 of FIGS. 3 and 6 and the processing of step 42 of FIG. 10 become unnecessary.

5. Fifth Embodiment

A fifth embodiment is adapted to write data obtained by multiplying velocity data VL by the delay time data DT, right panpot data PNr or left panpot data PNl, to an idle channel storage area of an assignment memory 15 when the velocity data VL is written thereto in steps 08, 37 and 39 (and 41). Moreover, in steps 25, 38 and 40 (and 41), the velocity data VL is not multiplied by the delay time data DT but is written to the assignment memory 15 without change. Alternatively, the data obtained by multiplying the velocity data VL by the right panpot data PNr or the left panpot data PNl is written to the assignment memory 15.

Accordingly, the volume of right and left tones composing a stereophonic sound can be controlled at the time of assigning channels to the right and left tones. In the fifth embodiment, it is not necessary to store the delay time DT in the assignment memory 15. Further, the panpot circuit 9 of FIG. 8 and the right panpot circuit 9R and the left panpot circuit 9L of FIG. 8 can be omitted.

In this case, when sound data of the assignment memory 15 is converted into generated envelope indicating data, and the data obtained as the result of this conversion is sent to an envelope waveform generating circuit 32, data indicating the level and rate of the envelope waveform of the generated envelope indicating data may be multiplied by the delay time data DT, the right panpot data PNr or the left panpot data PNl.

6. Sixth Embodiment

Figure 13:
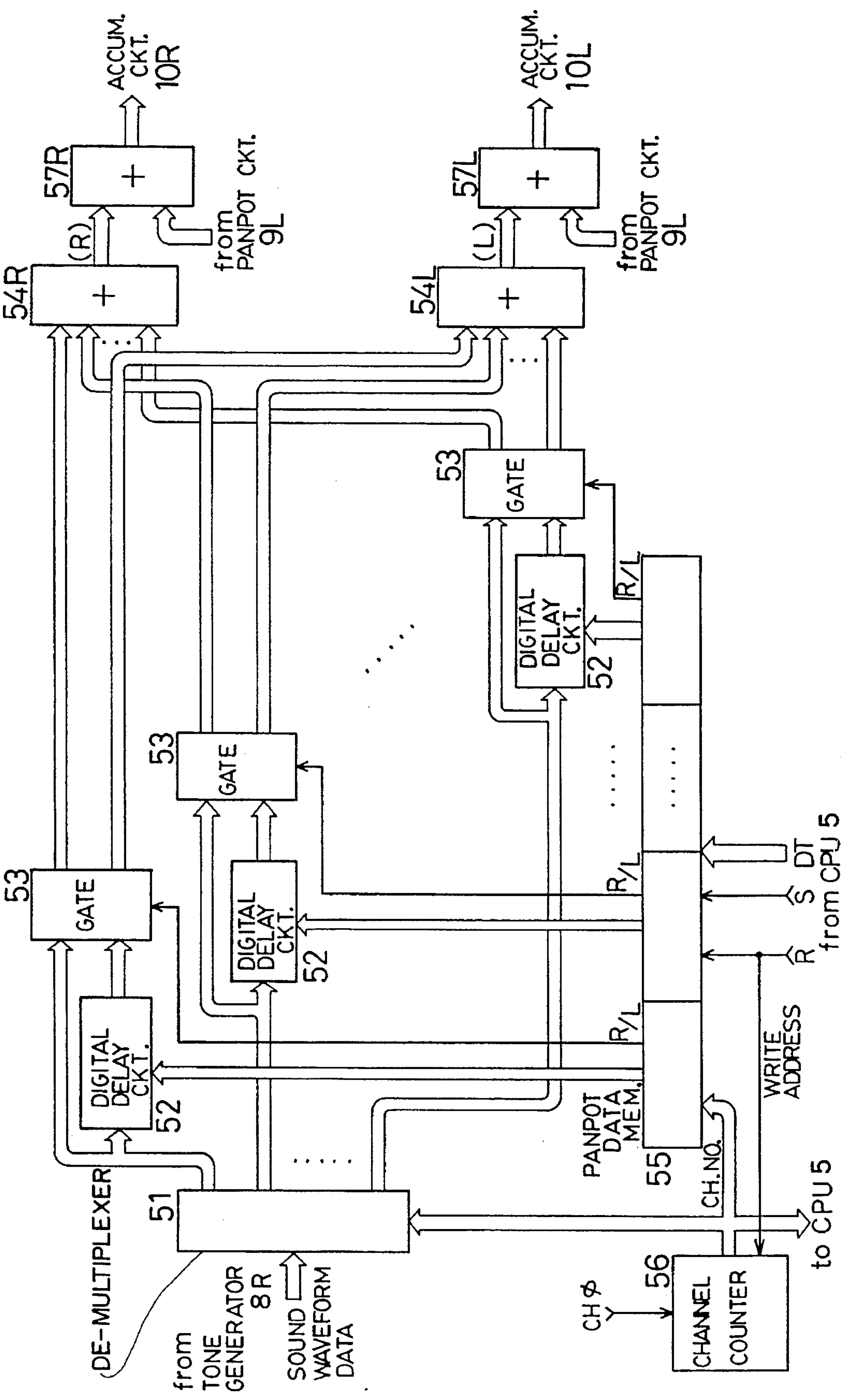
FIG. 13 is a schematic block diagram illustrating the construction of a panpot circuit 9 of a sixth embodiment.

FIG. 13 shows the construction of a panpot circuit 9R of a sixth embodiment of the present invention. The other panpot circuit 9L of this embodiment has the same structure as that of the panpot circuit 9R. In this embodiment, an output of waveform data corresponding to one of the right and left notes composing a stereophonic sound is delayed by a digital delay circuit 52. This delay time is indicated by delay time data DT and is set in a panpot data memory 55. This processing is performed on waveform data representing the waveform of a sound assigned to each channel.

Signals representing waveform data output from the tone generator 8R corresponding to each channel time are delayed by digital delay circuits 52, and are further sent to gate circuits 53 through a de-multiplexer 51. Each of the circuits 53 is composed of a gate similar to that of the groups 35R and 35L of the AND-gates and the inverter 39.

In each of the gate-circuits 53, the waveform data input thereto is divided into data (hereunder referred to as right note data) representing a right note and data (hereunder referred to as left note data) representing a left note. The right note data output from the gate-circuits 53 are added by an adder 54R, and the left note data output from the gate-circuits 53 are added by an adder 54L. Then, the result of the addition effected by the adder 54R is sent to the accumulator 10R through an adder 57R, and the result of the addition effected by the adder 54L is sent to the accumulator 10L through an adder 57L. Note, each of the digital delay circuits 52 is comprised of a charge coupled device (CCD) or a bucket brigade device (BBD), and delays a signal input thereto according to delay data.

Further, 16 locations or addresses are formed in a panpot data memory 55, and moreover, corresponding delay time data DT is written to each address of the memory 55. The write address data is channel number data output from a channel counter 56. A write command signal is a setting signal S sent from the CPU 5. The channel number data is also sent to the de-multiplexer 51. Signals representing the delay time data DT written to the panpot data memory 55 are sent to the digital delay circuits 52, whereupon the signals are delayed according to the values indicated by the delay time data DT. The data R/L represented by the most significant bit (MSB) of the delay time data DT is sent to the gate-circuit 53.

A channel clock signal CH ø is input to the channel counter 56, whereupon a hexadecimal channel number is counted. If this channel number data is in agreement with the channel number data of the sound data written to the assignment memory 15, the delay time data DT is written to the panpot memory 55 by the CPU 5.

Note, the panpot circuits 9R and 9L may be formed as one unit or circuit. In this case, 32 pairs of the digital delay circuit 52 and the gate-circuit 53 are formed, so that 32 locations or addresses are provided in the panpot data memory 55. Further, each pair of delay time data DT1 and DT2 is consecutively set in the panpot data memory 55. Furthermore, the tone generator 8R (or 8L) and the assignment memory 15 may be formed as one unit, whereby a timesharing processing can be performed by using 32 channels.

Further, the assignment memory 15 and the panpot circuits 9R and 9L may be formed such that the channels 0 to 15 correspond to predetermined sound images R3, R2, R1, R0, L0, L1, L2 and L3. In this case, the delay time data DT respectively corresponding to the sound images R3, R2, . . . , L3 are fixedly set in the panpot data memory 55, in this order. Note, the order in which the delay time data DT is set is not changed by the CPU 5.

Further, a stereophonic sound assigned to channels 0 and 1 corresponds to the position R3 of a sound image; another stereophonic sound assigned to channels 2 and 3 corresponds to the position R2 of a sound image: still another stereophonic sound assigned to channels 4 and 5 corresponds to the position R1 of a sound image; . . . ; and yet another stereophonic sound assigned to channels 4 and 5 corresponds to the position L3 of a sound image.

It is determined, on the basis of musical factors, to which of the channel storage areas of the assignment memory 15 sound data representing a tone to be sounded is written. In this embodiment, an order of sounding tones, pitches (or ranges), tone colors, the magnitude of the velocity, kinds of musical parts, the depth of effects, kinds of rhythms, the rate or depth of a modulation, volumes of sounds and the magnitude of a tempo may be employed as the musical factors. Data representing the musical factors are converted into corresponding channel number data or data indicating the position of a sound image through a decoder.

Then, channels corresponding to the channel number data obtained by the conversion are searched for an idle channel, and the detected idle channel is assigned to sound data representing a sound corresponding to a key newly depressed. Note, four or more panpot circuits may be provided in this embodiment, and thus the number of channels formed in each panpot circuit may be reduced.

Although preferred embodiments of the present invention have been described above, it is understood that the present invention is not limited thereto and that other modifications will be apparent to those skilled in the art without departing from the spirit of the invention. For example, a sound-image localization slide switch may be provided in the stereophonic sound system, to thereby perform a localization-shift of a sound image by sliding an operating part of the slide switch. In this case, data corresponding to a quantity of a slide of the operating part of the slide switch are added to or multiplied by the delay time data DT, the right panpot data PNr or the left panpot data PNl. Further, the slide switch can be turned on according to tone colors, ranges (or pitches), a velocity, musical sound parts, effects, the magnitude of a modulation or volumes of sounds.

Moreover, in addition to the change in position of a sound image and the selection of a position of a sound image, a change in the number of sound images and a change of the shift patterns of sound images may be employed as parameters representing a change of a sound image. When employing the change in the number of sound images, a plurality of channel number data and sound-image position data are set for a musical factor, and a plurality of channels are simultaneously assigned to the same sound data. When employing the change of the shift-patterns of a sound image, the value indicated by the delay time data DT set in the panpot circuits 9R and 9L is periodically changed by adding periodically varying data thereto, subtracting the periodically varying data therefrom, or multiplying or dividing the value indicated by the data DT by that indicated by the periodically varying data.

Furthermore, in addition to waveform data as illustrated in FIG. 11, waveform data discriminated according to the sounds of various musical instruments (e.g., a piano, a violin, and drums), waveform data discriminated according to kinds of waveforms (for example, a sine wave, a chopping wave and a square wave), waveform data discriminated according to the content ratios of specific components such as harmonic components or noise components, waveform data discriminated according to differences among various frequency components corresponding to groups of spectra of specific frequency bands corresponding to specific formats or waveform data representing a waveform between a start and an end of an operation of sounding a stereophonic sound, may be employed as waveform data stored in the waveform memory 33.

Also, instead of the two-way loudspeaker system including the right and left loudspeakers 13R and 13L, a multi-directional loudspeaker system including three or more loudspeakers may be employed. In this case, instead of the tone generators 8R and 8L, the panpot circuits 9R and 9L, the accumulators 10R and 10L, the D/A converters 11R and 11L and the amplifiers 12R and 12L a number of such devices equal to that of the loudspeakers of the multi-way loudspeaker system are provided in the stereophonic sound system. Moreover, the data R/L contained in the delay time data DT is represented by using two or more bits. For example, where a multi-directional loudspeaker system composed of four loudspeakers is employed, 3-bit data R/L capable of representing 6 or 8 states is required.

Further, sounds produced as a result of an analog signal processing or sounds generated by another sound source such as a tape recorder, an optical digital audio disk reproducer, a floppy disk reproducer, a television receiver and a tuner may be employed as sounds to be radiated from the loudspeakers 13R and 13L, in addition to sounds generated as a result of a digital data processing.

The scope of the present invention, therefore, is to be determined solely by the appended claims.

What is claimed is:

1. A stereophonic sound generation system using a timing delay comprising:

a plurality of sound data generating means having a capacity for generating a plurality of sound data in parallel;

first generation control means for controlling a generation of a first of the plurality of sound data from at least one of said plurality of sound generating means in response to one sounding operation by changing a state of the first of the plurality of sound data from a non-sounding state to a sounding state;

difference time data generating means for generating difference time data representing a difference between moments at which the plurality of sound data are generated;

second generation control means for controlling a generation of the first of said plurality of sound data as generated by said first generation control means from another one of said plurality of sound data generating means, different from the at least one of the plurality of sound data generating means, controlled by said first generation control means, by changing a state of the first of said plurality of sound data from a non-sounding state to a sounding state after a delay according to the difference time data generated by said difference time data generating means; and output means for outputting the plurality of sound data generated by the at least one of said plurality of said data generating means and the another one of said plurality of said data generating means to different sounding means.

2. The stereophonic sound generation system of claim 1, wherein said second generation control means changes a state of the plurality of sound data from a non-sounding state to a sounding state by measuring the difference time data generated by said difference time data generating means.

3. The stereophonic sound generation system claim 1, wherein said second generation control means controls a moment at which each of the plurality of sound data generated in parallel is produced, by controlling a reading of each of the plurality of sound data stored in said stereophonic sound generation system.

4. The stereophonic sound generation system of claim 1 wherein said plurality of sound generating means, said first generation control means, and said second generation control means perform processing of the plurality of sound data in a time-sharing manner.

5. The stereophonic sound generation system of claim 1, further comprising:

level control data generating means for generating level control data representing a level controlling value of the sound data, and level control means for controlling a level of the sound data generated by said first and second generation control means based on the level control data generated by said level control data generating means.

6. The stereophonic sound generation system of claim 1, wherein a change of a state of the sound data from a non-sounding state to a sounding state is at least one of assignment of a plurality of sound generation channels.

7. The stereophonic sound generation system of claim 6, wherein the plurality of sound generation channels are divided in two groups, one for a right stereo sound source and another for a left stereo sound source.

8. A stereophonic sound generation system using timing delay comprising:

sound data storing means for storing sound data;

first sound data reading means for reading the sound data stored in said sound data storing means in response to a sounding operation;

difference time data generating means for generating difference time data representing a difference between moments at which two pieces of the sound data are generated;

second sound data reading means for reading the sound data read by said first sound data reading means after a delay according to the difference time data generated by said difference time data generating means; and output means for outputting the two pieces of the sound data by said first and second sound data reading means to different sounding means.

9. The stereophonic sound generation system of claim 8, wherein the delay according to the difference time data corresponds to a quantity of read data of a soundless section provided prior to a storage area storing the plurality of sound data.

10. The stereophonic sound generation system of claim 8, wherein the delay according to the difference time data results from controlling a moment at which a reading started, according to a quality of sound data corresponding to another sound to be sounded earlier.

11. The stereophonic sound generation system of claim 10, wherein the delay according to the difference time data results from starting a reading of sound data corresponding to a sound to be sounded later when an accumulated frequency number corresponding to sound data corresponding to a sound to be sounded earlier agrees with a difference between a moment at which the sound data corresponds to the sound to be sounded earlier and another moment at which the sound data corresponds to the sound to be sounded later.

12. The stereophonic sound generation system of claim 8, wherein said first and second sound data reading means perform a corresponding reading of the sound data in a time-sharing manner.

13. The stereophonic sound generation system of claim 8, further comprising:

level control data generating means for generating level control data representing a level controlling value of the sound data, and level control means for controlling a level of the sound data read by said first and second reading means based on the level control data generated by said level control data generating means.

14. The stereophonic sound generation system of claim 1 or 8, wherein the difference time data varies according to data representing a musical factor.

15. The stereophonic sound generation system of claim 14, wherein the musical factor is a pitch or a range.

16. The stereophonic sound generation system of claim 14, wherein the musical factor is a tone color.

17. The stereophonic sound generation system of claim 14, wherein the musical factor is a speed or strength of a sounding operation.

* * * * *